Patented Aug. 13, 1940

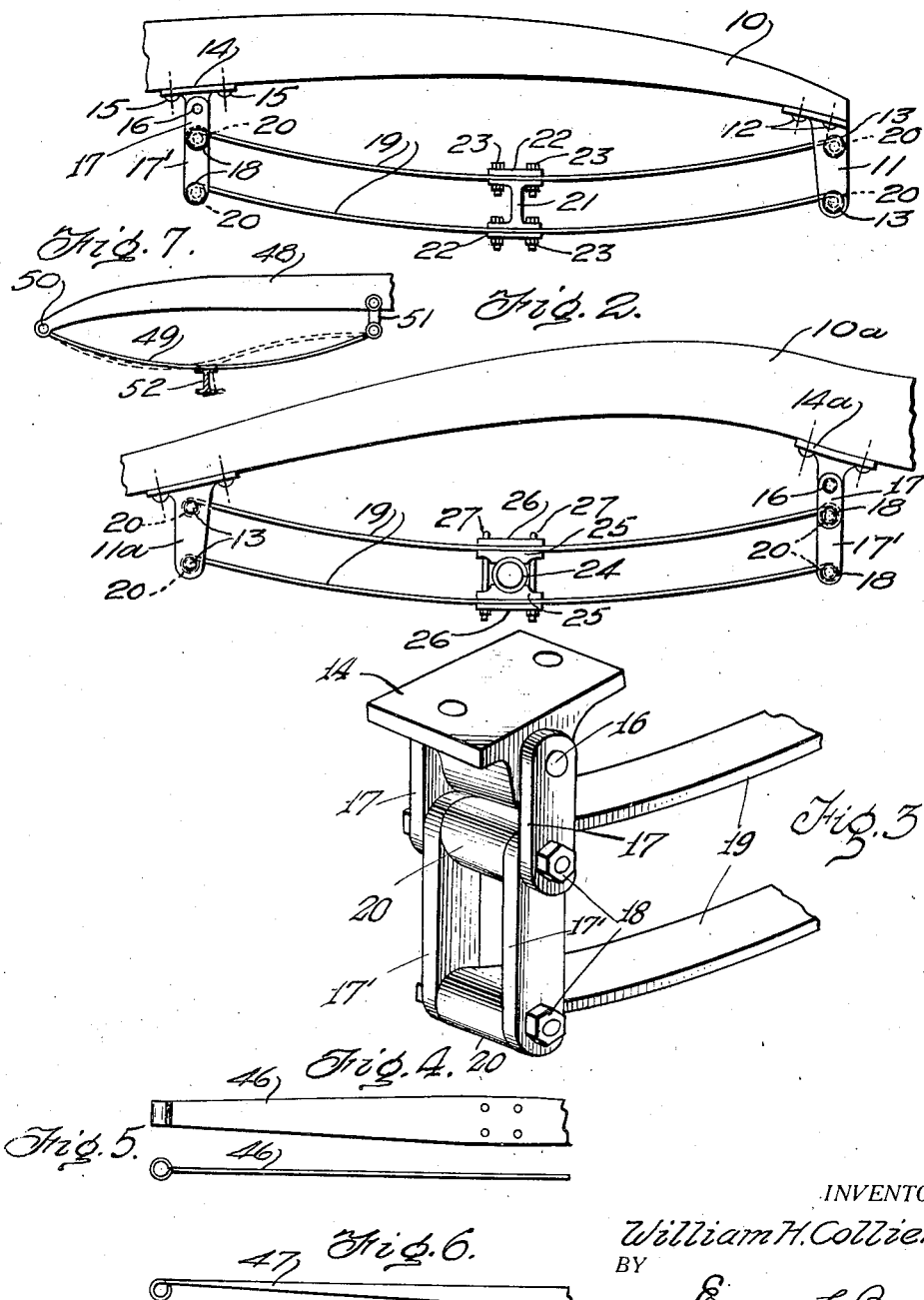

2,211,647

UNITED STATES PATENT OFFICE 2,211,647

SPRING SUSPENSION FOR AUTOMOTIVE VEHICLES

William H. Collier, Jackson, Tenn.

Application February 5, 1940, Serial No. 317,427

4 Claims. (Cl. 267—38)

This invention relates to vehicle spring suspensions and particularly to longitudinal and transverse spring suspensions for automotive vehicles.

It is common practice to use, for automotive vehicle springs, a type of leaf spring leaving a considerable number of leaves frictionally engaged throughout but this construction has long been known to be undesirable because of the friction produced between the leaves by flexing of the springs and because squeaking occurs unless great care is taken to keep the springs well lubricated. Also such springs are too stiff to absorb the many minor shocks due to the roughness of even the best highways. Efforts have been made in various ways to overcome the objections inherent in the usual stiff multiple-leaved springs. Among these efforts it has been proposed to decrease the stiffness of the several leaves by lowering the combined carbon content of the steel employed or by lowering the temper of the steel. Also it has been proposed to decrease the number of leaves and even, in some cases to employ single leaf springs. These efforts however have been ineffectual as they have failed to provide against displacement of axles due to braking torque and driving torque, both of which tend to cause rotation of an axle on its axis and stresses tending to shift the axle bodily out of its proper position.

Among the important objects of the present invention are to provide a novel spring arrangement which will overcome the objections above set forth; to provide a novel mounting for such springs whereby a parallelogram of stress members will be provided, acting to prevent axle displacement both in rotation and bodily; to enable a minimum number of leaves to be used in the springs and even to enable the use of single leaf springs so that leaf friction will be greatly reduced or entirely eliminated.

With the above and other objects in view, as will presently appear, the invention will now be described in several preferred embodiments.

In the accompanying drawing like characters of reference indicate like parts in the several views, and:

Figure 1 is a side elevation of an end portion of an automobile frame and showing one type of axle carrying the improved spring arrangement.

Figure 2 is a view similar to Figure 1 but showing a second form of axle associated therewith.

Figure 3 is a fragmentary view showing in perspective the spring shackle suspension shown at the left hand side of Fig. 1, and the right hand side of Fig. 2.

Figure 4 is a fragmentary plan view of one form of spring leaf for use in this invention.

Figure 5 is an edge of the spring shown in Figure 5.

Figure 6 is a fragmentary edge view of a second form of spring for use in this invention.

Figure 7 is an illustrative side view showing the manner in which axle displacement occurs under torque in the prior art.

In the form of the invention shown in Figure 1 there is illustrated a rear portion 10 of an automobile frame. A rigid bracket 11 depends from the rear end of this frame and is secured to the frame by rivets 12. This bracket is of the forked type and bolts or pins 13 extend between and are supported by the arms of the fork in vertically spaced relation. A second bracket 14 depends from the frame 10 in spaced relation to the bracket 11 being secured to the frame by rivets 15. A pivot pin 16 extends through the bracket 14 and forms a pivotal support for a pair of spring shackles 17. The pivot pin 16 passes through the upper ends of these shackles so that they depend therefrom. A bolt or pin 18 spans the space between the lower ends of the shackles 17 and forms a pivot for a second pair of shackles 17' which depend therefrom. A bolt 18 spans the space between the lower ends of the shackles 17'. The vertical spacing of the bolts or pins 18 equals the vertical spacing of the bolts or pins 13. Spring leaves 19 have eyes 20 on their ends and the bolts 13 and 18 pass through these eyes and thus connect the leaves to the bracket and shackles. These leaves may be of either the form shown in Figures 4 and 5 or the form shown in Figure 6 and are preferably identical in strength and shape. As here shown the leaves 19 are arcuate in edge view being curved downwardly between their supporting bolts. An I-beam axle 21 is disposed between the springs 19 at the centers thereof and the spacing of the bolts 13 and 18 preferably is such as to equal the height of the I-beam axle. Cover or clamping plates 22 are provided above and below the springs opposite the axle and bolts 23 pass through the plates 22, the springs 19 and the flanges of the axle 21 and thus secure the parts rigidly together at this place. It is now to be observed that the axle 21, the rigid bracket 11 and those parts of the springs which extend between the axle and the bracket 11 form a parallel motion device so that the axle can only move vertically with respect to the frame and cannot have any rotative movement. At the same time the shackles 17 and 17' can swing to compensate any change in the extent of flexure of the springs. In this form of the invention it will be obvious that if both ends of the springs were swingingly supported, the parallel motion arrangement would not exist and the axle could shift bodily in a direction longitudinally of the frame and in so doing would also have a rotative movement on its axis.

In the form shown in Figure 2 the arrangement and function is substantially identical with that of Figure 1, the only difference being due to the difference of positions of the parts relative to the frame and the difference in the character of the axle attachment. In this form the frame position is shown at 10a, the rigid bracket at 11a and the remaining bracket at 14a. The axle 24 is supported between a pair of axle seats 25 which rest against respective springs 19. Cover plates 26 are provided and U-bolts 27 serve to hold the parts together. Otherwise the same elements are shown as occur in Figure 1.

The organization embodied in the present invention provides a vehicle suspension which has the advantages of a single leaf spring while eliminating the disadvantages inherent in the multiple leaf spring, due to internal friction when the spring is deflected, as each leaf rubs against the adjacent leaves. The action of this multiple leaf type of spring is retarded an amount equal to the frictional resistance of each individual leaf upon the adjacent leaves. Consequently the frictional resistance must first be overcome, which retards the oscillation of the spring and its complemental body, subjecting the body and axle to sudden jars and obviously the return of the spring and body to its normal position is correspondingly retarded.

The modern fast driven vehicles, such as automobiles, demand a spring suspension capable of very rapidly absorbing excessive vibrations resulting from the combination of rough roads and fast driving. In eliminating the multiple leaf spring with its internal friction retardation, this invention coordinates the several features which enable the resiliency and quick response of the single leaf spring to function in an organization possessing sufficient strength and endurance to withstand the sudden stresses and blows to which it is subjected in a vehicle operated at the present speed of modern automobiles and absolutely prevents axial displacement under braking stresses.

The sudden application of the powerful brakes tend to cause rotation of an axle on its axis and produce stresses tending to shift the axle bodily out of its proper position. It has been shown above that by placing the axle between the upper and lower springs, centrally thereof, the resulting forces of tension and compression in a parallelogram of forces act to prevent axle displacement both in rotation and bodily. To provide this parallelogram of forces the upper and lower springs are pivotally secured to a rigid bracket at one end. Furthermore, it is essential that the parallel relation of the springs at the opposite end shall be maintained and this is accomplished by pivotally connecting the two springs properly spaced to the same pair of links 17'. Again any movement of the two springs with relation to the frame of the automobile must be a unitary movement and hence shackles 17' to which both springs are secured, are pivotally secured to shackles 17', which are swung upon pivots 16 carried by brackets 15 bolted to the frame. It is apparent, therefore, that the interaction of all of these parts are essential to the functioning of the organization which is embodied in the present invention.

The leaf springs used herein may be of uniform width and thickness throughout their extent, they may taperingly narrow from the center toward each end as shown at 46 in Figures 4 and 5 or they may taper in thickness from the center toward each end as shown at 47 in Figure 6.

The results of the constructions of prior art are shown in Figure 7 wherein a frame portion 48 has one end of a spring 49 directly connected thereto by a bolt 50. The other end of the spring is connected to the frame by spring shackle means 51. The axle is shown at 52 and with this construction any great stress applied to the axle will result in the spring distorting as shown in dotted lines with consequent tilting and bodily shifting of the axle.

What is claimed, is:

1. Vehicle spring suspension comprising a pair of vertically spaced members one of which constitutes a vehicle frame part and the other of which constitutes a vehicle axle, a pair of vertically spaced and substantially parallel single leaf springs the central portions of which are fixed respectively upon the top and bottom of one of said members and the ends of which are connected to the other of said members, the ends at one side of the center having fixed positional relation to the member to which they are connected, whereby to form a parallel motion device, the other end of the upper spring being pivotally connected to said frame parts by a pair of shackles and the other end of the lower spring being pivotally connected to said first-named shackles and said other end of the upper spring by a pair of shackles depending therefrom.

2. Vehicle spring suspension comprising a pair of vertically spaced members one of which constitutes a vehicle frame part and the other of which constitutes a vehicle axle, a pair of vertically spaced and substantially parallel single leaf springs, the central portions of which are bolted respectively above and below the axle in fixed relation thereto and the ends of which are connected to the other of said members, the ends at one side of the center having fixed positional relation to the vehicle frame, whereby to form a parallel motion device, the other ends of the springs being pivotally connected to the upper and lower ends of a pair of shackles and a pair of shackles pivotally connected to said frame and to said first-named pair of shackles respectively.

3. A vehicle spring suspension including a vehicle frame member, a rigid bracket fixed to and depending from said frame member, a second bracket fixed to and depending from said frame member in spaced relation along the frame member from the first bracket, a pair of substantially parallel spring leaves, and an axle secured between said leaves at their centers and constituting a spacer for said leaves, said leaves having the ends at one side of the center connected to fixed vertically spaced points of the first named bracket, the other ends of the springs being pivotally connected to the upper and lower ends of a pair of shackles and a pair of shackles pivotally connected to said second named bracket and to said first named pair of shackles respectively.

4. A vehicle spring suspension including a vehicle frame member, a rigid bracket fixed to and depending from said frame member, a second bracket fixed to and depending from said frame member in spaced relation along the frame member from the first bracket, spring shackle means comprising a pair of shackles pivoted to and depending from the second bracket and a second pair of shackles pivotally depending from said first pair, a pair of substantially parallel spring leaves and an axle secured between said leaves at their centers and constituting a spacer for said leaves, said leaves having ends at one side of the center connected to fixed vertically spaced points of the first bracket and their remaining ends fixed to vertically spaced points on said pair of depending shackles, the vertical spacing between the spring attachments to the first bracket being equal to the spacing between the spring attachments to said depending shackles.

WILLIAM H. COLLIER.